Patented July 9, 1946

2,403,776

UNITED STATES PATENT OFFICE 2,403,776

PREPARATION OF 2-(N⁴-ACYLSULPHANIL-AMIDO) PYRAZINE

Philip S. Winnek, Indianapolis, Ind., assignor to American Cyanamid Company, New York, N. Y., a corporation of Maine No Drawing. Application August 25, 1943, Serial No. 499,995

3 Claims. (Cl. 260—239.6)

1

The present invention relates to a process for preparing 2-($N^4$-acylsulphanilamido) pyrazines. More particularly, the present invention relates to the process for producing 2-($N^4$-acylsulphanilamido) pyrazines by reacting 2-chloropyrazine or 2-bromopyrazine with an $N^4$-acylsulphanilamide or metal salt thereof.

In carrying out the process of the present invention the $N^4$-acylsulphanilamide or metal salt is heated with 2-chloropyrazine or 2-bromopyrazine in the presence of a basic substance and under substantially anhydrous conditions. During the course of the reaction hydrogen halide is liberated and, where good yields are to be obtained, it is desirable to provide a basic substance for binding the liberated hydrogen halide. This can be very readily accomplished by carrying the reaction out in the presence of a basic carbonate, bicarbonate, or hydroxide which will neutralize the hydrogen halide as formed, thus removing it from the site of the reaction. Among the basic materials suitable for this purpose are potassium carbonate, sodium carbonate, potassium bicarbonate, sodium bicarbonate, potassium hydroxide, and sodium hydroxide, etc.

The temperature at which the reaction can be carried out may be varied depending upon the basic substance employed and upon the $N^4$-acylsulphanilamide or metal salt employed. In general, the reaction proceeds smoothly when temperatures of from about 150 to 300° C. are employed. The preferred operating temperature, when one of the reactants is $N^4$-acetylsulphanilamide, is within the range of from 200 to 240° C.

While it may not be essential, it has been found desirable to employ condensation catalysts, including certain powdered metals, such as platinum, silver, and copper. In this respect copper is entirely satisfactory and is somewhat cheaper than the other metals mentioned and for reasons of economy is preferred.

In my preferred process I react $N^4$-acetylsulphanilamide with 2-chloropyrazine. These intermediates are perhaps the cheapest and those that are most readily available, and, when the reaction product is subsequently to be converted into 2-sulphanilamido pyrazine, such reagents offer the greatest economical advantages. On the other hand, when my process is employed for the production of an $N^4$-acylsulphanilamido pyrazine, which is itself useful, it is clearly understood that instead of $N^4$-acetylsulphanilamide, I may employ any $N^4$-acylsulphanilamido, including those, such as the $N^4$-propionyl, -butyryl, -decoyl, -benzoyl, -furoyl, -and the like.

2

Similarly, instead of the sodium salt of the $N^4$-acylsulphanilamides I may use any other metal salt, including those, such as the potassium, calcium, lithium, copper, silver, and the like.

The invention will be described in greater detail in conjunction with the following specific examples, which are merely illustrative of suitable methods for preparing representative compounds and are not intended to limit the scope of the invention.

EXAMPLE 1

2-($N^4$-acetylsulphanilamido) pyrazine

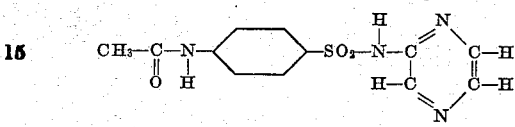

21.4 g. of $N^4$-acetylsulphanilamide, 13.8 g. of anhydrous potassium carbonate, and 1 g. of copper powder are well mixed and placed in a three-necked flask fitted with a mechanical stirrer and reflux condenser. 11.5 g. of 2-chloropyrazine are added, and the mixture heated in an oil bath (bath temperature, 220–240° C.) with stirring for four hours. The reaction mixture is cooled and 250 cc. of water added. The mixture is stirred with decolorizing charcoal and filtered. On neutralizing the filtrate with 6 N hydrochloric acid, a brown precipitate separates. After standing in the cold, the solid material is filtered off and suspended in dilute ammonium hydroxide. The mixture is filtered, and the filtrate stirred with decolorizing charcoal. The solution is neutralized with dilute hydrochloric acid, and the 2-($N^4$-acetylsulphanilamido) pyrazine separates as a light brown solid with a melting point, 234–237° C. The yield was 5.2 g.

EXAMPLE 2

2-($N^4$-acetylsulphanilamido) pyrazine 2.37 g. of sodium acetylsulphanilamide, 5.8 g. of chloropyrazine, 1.38 g. of anhydrous potassium carbonate, and 0.10 g. of copper powder are mixed well and refluxed with stirring on an oil bath (150° C.) for three hours. The mixture softens and forms a gummy mass in the excess of chloropyrazine. The gummy mass is dissolved in water and the crude acetylsulphanilamido pyrazine is precipitated with dilute hydrochloric acid —yield, 2.0 g. The product is purified by dissolving in dilute ammonia, treated with decolorizing charcoal, and is precipitated with dilute hydrochloric acid. The product is then recrystallized from 50% ethanol.

While 2-chloropyrazine is used in the above examples, it is to be understood that 2-bromopyrazine can be used. The 2-chloropyrazine is preferred because it is more readily available than 2-bromopyrazine at the present time. The preparation of 2-chloropyrazine is described in my copending application, Serial No. 499,993, filed August 25, 1943. It is also to be understood that sodium hydroxide or other bases mentioned can be used in place of potassium carbonate.

The above descriptions and examples are intended to be illustrative only. Any modification of or variation therefrom which conforms to the spirit of the invention is intended to be included within the scope of the claims.

What I claim is:

1. The process of producing a 2-($N^4$-acylsulphanilamido) pyrazine which comprises heating at a temperature within the range of 150° C. to 300° C. a substance selected from the group consisting of $N^4$-acylsulphanilamides and metal salts thereof with a 2-halogenated pyrazine selected from the group consisting of 2-chloropyrazine and 2-bromopyrazine, in the presence of a basic substance and copper powder.

2. The process of producing 2-($N^4$-acetylsulphanilamido) pyrazine which comprises heating at a temperature within the range of 150° C. to 300° C. a substance selected from the group consisting of $N^4$-acetylsulphanilamide and metal salts thereof with 2-chloropyrazine, in the presence of a basic substance and copper powder.

3. The process of producing 2-($N^4$-acetylsulphanilamido) pyrazine which comprises heating at a temperature within the range of 150° C. to 300° C. the sodium salt of $N^4$-acetylsulphanilamide with 2-chloropyrazine in the presence of potassium carbonate and copper powder.

PHILIP S. WINNEK.